Feb. 2, 1937. W. STUEBING, JR 2,069,484
STAND FOR DISPLAY DEVICES
Original Filed Feb. 14, 1933 2 Sheets-Sheet 1
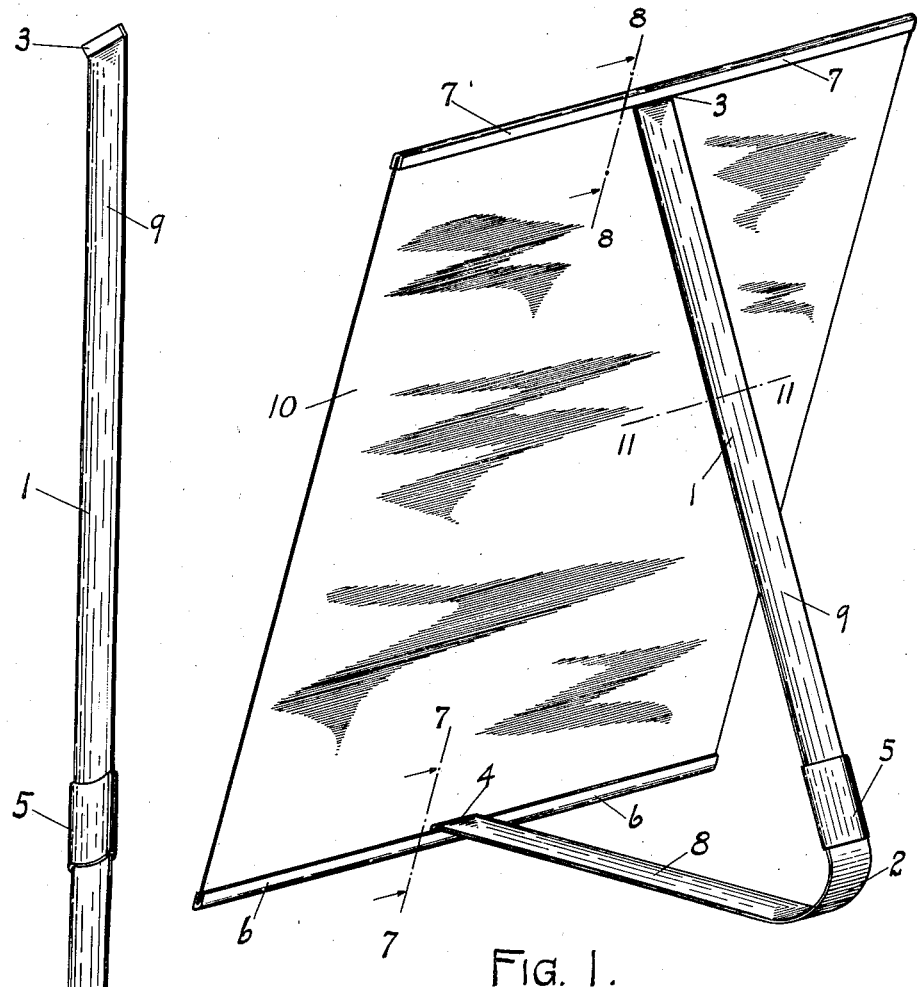
FIG. 1.
FIG. 2
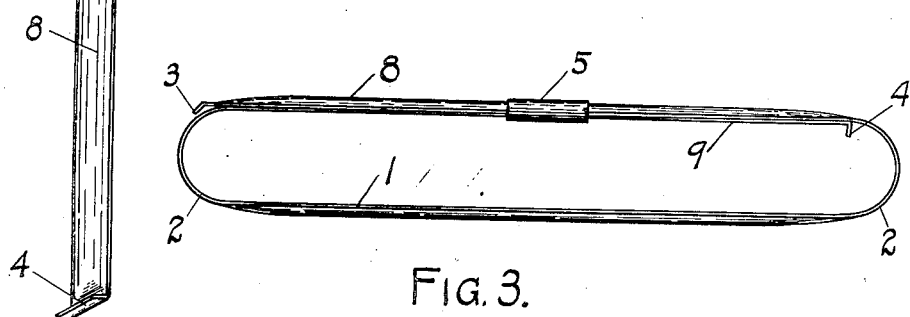
FIG. 3.
INVENTOR.
William Stuebing Jr.
BY
ATTORNEYS INVENTOR.
William Stuebing Jr.
ATTORNEYS Patented Feb. 2, 1937

2,069,484

UNITED STATES PATENT OFFICE 2,069,484

STAND FOR DISPLAY DEVICES

William Stuebing, Jr., Cincinnati, Ohio

Application February 14, 1933, Serial No. 656,707
Renewed November 13, 1935

10 Claims. (Cl. 40—125)

This invention relates to display devices and with regard to the more specific aspects thereof to a stand for supporting a flexible poster or flexible sheet of any character in a stretched-out upright position.

One object of the invention is to provide a simple, inexpensive and practical stand easily adjustable to change the angular position of the display sheet. Another object is to provide a unitary prop for a flexible display sheet which will require no means of attachment to the display sheet other than the ordinary binding of the sheet. Another object is to provide such a stand capable of being firmly held in a folded condition in order that it may be rolled within the display sheet for purposes of shipping. Still another object is to provide a simple and inexpensive easel or stand of the character described that may be assembled or disassembled quickly and easily without tools and without instructions.

Other objects will be in part obvious and in part pointed out hereinafter.

This invention accordingly consists in the several steps and relation and order of each of the same to one or more of the others, all as will be described herein, and the scope of the application of which will be indicated in the following claims.

Referring to the drawings,

Fig. 1 is an isometric rear view of a display device embodying my invention;

Fig. 2 is an isometric view of a unitary stand or supporting member in its normally extended condition;

Fig. 3 shows the prop or stand member as it will appear when folded ready for shipping rolled within a display sheet;

Heretofore devices have been provided for the purpose of holding calendars, banners, posters, and other similar flexible display sheets in a straightened or taut condition and providing propping means for holding them in an upright position. Such means, however, as heretofore known have had many disadvantages attending them, both as to construction and as to use, and have usually comprised a plurality of detachable parts suitably held together when employed to sustain the display sheet. The present invention enables me to avoid these disadvantages and to produce a unitary easel structure adapted to hold the display sheet in a straightened condition at any desired angle with respect to the vertical, which may be simply and inexpensively manufactured, easily folded for rolling within the display sheet for shipment, and which provides other positive advantages which will be apparent from the following description thereof.

Figure 4:
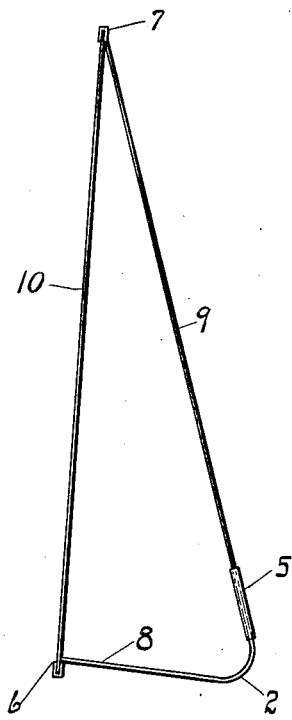
Fig. 4 is a side view showing the stand member operatively related to a display sheet and holding the same in a taut upright position closely approaching the vertical.
Figure 5:
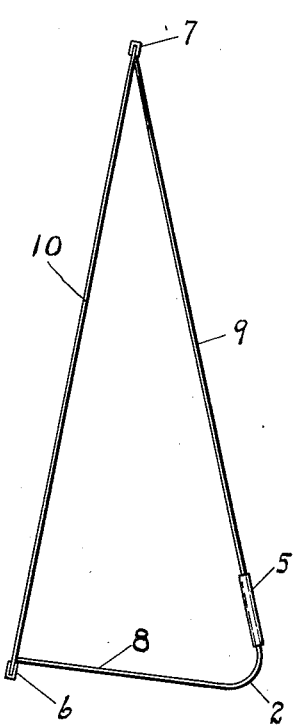
Fig. 5 is a view similar to Fig. 4 with the easel adjusted to support the display sheet at a greater angle with respect to the vertical.
Figure 6:
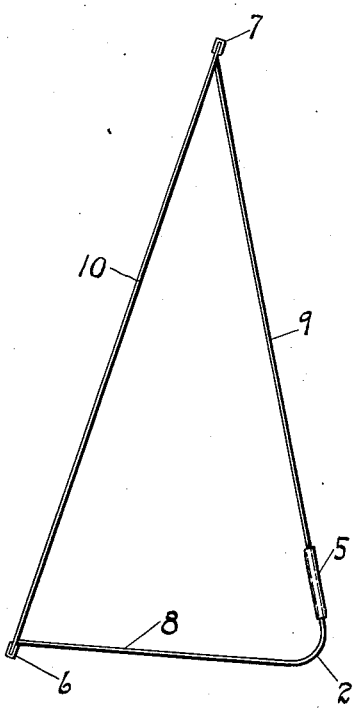
Fig. 6 is a view similar to Figs. 4 and 5 but showing the display sheet supported at a still greater angle.
Figure 8:
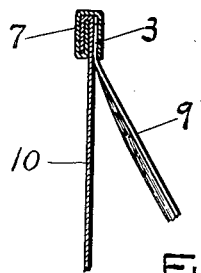
Fig. 8 is a section taken on line 8—8 of Fig. 1.
Figure 10:
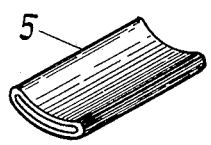
Fig. 10 is an isometric view of a sleeve employed to determine the angular position of the stand member with respect to the display sheet.
Figure 9:
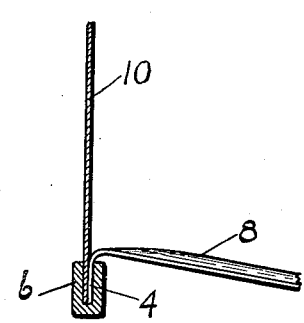
Fig. 9 is a view similar to Fig. 7 of the stand member attached to a display sheet having a different type of binding strip.
Figure 7:
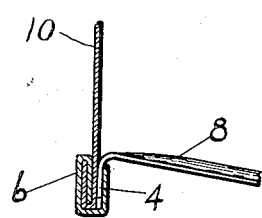
Fig. 7 is a section taken on line 7—7 of Fig. 1.

Referring to Fig. 1 I have shown a poster or other display sheet composed of paper or other flexible material supported in upright position by a stand member 1. The display sheet is indicated by the reference numeral 10, and the upper and lower binding strips by the numerals 7 and 6 respectively. In Figs. 7 and 8 I have shown a preferred form of completed display sheet in which the top and bottom edges of the sheet are folded within the folds of a metallic strip constituting the binding means. In Fig. 9 I have shown a wooden binder covering the lower edge of the display sheet. It will be understood, of course, that the upper edge is bound in the same way.

Figure 11:
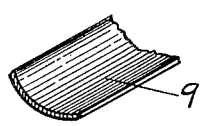
Fig. 11 is a section taken on line 11—11 of Fig. 1 and showing a part of the flexible stand member in isometric drawing.

The stand member 1 comprises a tempered metallic ribbon which has been rolled or otherwise permanently distorted so as to provide the ribbon with a concavo-convex transverse cross-section as indicated in Fig. 11. The ends of the ribbon have been given a permanent distortion to provide lip portions 3 and 4 adapted to slip under the rear laps of binding strips 7 and 6 respectively and to be firmly retained between said rear laps and the edges of the display sheet. It will be understood that the stand member 1 is of greater length than the distance between the opposite edges of the display sheet to which it is attached.

It is well known that a concavo-convex ribbon of the type described has an inherent tendency to maintain itself in a straightened condition so that when such a strip is bent it will immediately assume such straightened condition when released. At the same time the portion of the ribbon where the bend occurs, as at 2 in the drawings, looses its concavo-convex cross-section and becomes flat. Advantage is taken of this characteristic of such metallic ribbons to provide a stand member which may be bent at any point in its length to provide a lower leg 8 adapted to rest upon a table or other support and an upper leg 9 adapted to maintain the sheet in its desired upright position, it being understood that the lips 3 and 4 which have been slipped beneath the rear laps of the binding members of the display sheet are held by the display sheet against their tendency to separate from each other beyond the position they assume when the display sheet has been fully stretched by the resilient stand member.

The means for varying the relative lengths of the legs 8 and 9 and the angle therebetween so that the display sheet may be held at any desired angle with respect to the vertical, is a sleeve member 5 which may be made of any suitable material and form provided that within the sleeve there is a flattened passage through which the metallic ribbon will pass. This sleeve is so designed that as it is moved from point to point along the length of the ribbon it tends slightly to flatten the ribbon and is thus held in any particular position with considerable friction. It is obvious that when the sleeve is moved downwardly along the leg 9 of the bent ribbon it will change the position of the bend 2 relatively to the ends of the ribbon and so change the lengths of the legs 8 and 9; and that further when it is in any adjusted position the relative lengths of the legs 8 and 9 will be maintained so that the calendar or other display device will be positively held at the desired angle.

From the foregoing it is believed that the manner of operating the device is largely evident. However, it may be said that when it is desired to set up a display device which has been shipped rolled about its folded stand member, the member is bent sufficiently to permit the lips 3 and 4 to pass under the bindings on the opposite ends of the display sheet and then the sleeve 5 is moved in either direction to attain the angle at which it is desired the display device shall stand. If it is desired to take the display device down the ends of the stand member may be easily pulled from under the edge bindings. Then the said member may be folded over upon itself as shown in Fig. 3 and an end thereof passed again through the sleeve member 5. The folded length of the stand member may be adjusted to accord with the width of the sheet within which it is to be rolled.

There is no difficulty in passing the end through the sleeve as the lips 3 and 4 may be easily flattened sufficiently to pass through the passage in the sleeve and will immediately assume their offset condition after passage through said sleeve.

It will be seen that there is provided a construction of an essentially practical nature in which the several objects of this invention are attained.

As many possible embodiments may be made of the above invention without departing from the scope thereof, it is to be understood that all matter herein set forth or shown in the accompanying drawings is to be interpreted as illustrative and not in a limiting sense.

I claim:

1. In a display device, in combination, a flexible sheet, a unitary resilient member of greater length than the distance between opposite edges of said sheet and comprising two angularly related legs connected by a bend, means cooperating with said member between its ends to fix the relative lengths of said legs, and means for securing the ends of said legs to opposite edges of said sheet.

2. In a display device of the character described, in combination, a flexible display sheet, a metallic ribbon having the inherent tendency to maintain itself in straightened condition and of a length greater than the distance between selected points on said sheet, means for securing the ends of said ribbon to the sheet at said selected points, and means cooperating with said member between its ends for maintaining a bend in said ribbon at any desired portion of its length to determine the relative lengths of ribbon positioned upon either side of said bend.

3. In a display device of the character described, in combination, a flexible display sheet having binding members secured to opposite edges thereof, a metallic ribbon of a length greater than the distance between said binding members, and means at the ends of said ribbon adapted to engage portions of said binding members and be retained thereby, said ribbon having the inherent tendency to maintain itself in straightened condition and to form a pair of straight leg portions connected by a relatively sharp bend when the ribbon is flexed to bring its ends into engagement with said binding members.

4. In a display device of the character described, in combination, a flexible display sheet having binding members secured to opposite edges thereof, a metallic ribbon of a length greater than the distance between said binding members, means at the ends of said ribbon adapted to engage portions of said binding members and be retained thereby, said ribbon having the inherent tendency to maintain itself in straightened condition and to form a pair of straight leg portions connected by a relatively sharp bend when the ribbon is flexed to bring its ends into engagement with said binding members, and means for fixing the relative lengths of said leg portions.

5. In a display device of the character described, in combination, a flexible display sheet having binding members enveloping opposite edges thereof, a metallic ribbon having the inherent tendency to maintain itself in straightened condition and of a length greater than the distance between said binding members, means at the ends of said ribbon adapted to underlie portions of said binding members and be held in place thereby, and adjustable means for maintaining a bend in said ribbon to provide supporting legs for said display device.

6. In a display device of the character described, in combination, a flexible display sheet having binding members enveloping opposite edges thereof, a metallic ribbon having the inherent tendency to maintain itself in straightened condition and of a length greater than the distance between said binding members, means at the ends of said ribbon adapted to underlie portions of said binding members and be held in place thereby, and adjustable means for maintaining a bend in said ribbon at any desired portion of the length thereof.

7. As an article of manufacture, a supporting stand for a flexible display sheet of known dimensions comprising a tempered metallic ribbon having a concavo-convex cross-section and of a length greater than the distance between two opposite edges of said sheet, and means for attaching the ends of said ribbon to said opposite edges of said sheet.

8. As an article of manufacture, a supporting stand for a flexible display sheet of known dimensions comprising a tempered metallic ribbon having a concavo-convex cross-section and of a length greater than the distance between two opposite edges of said sheet, means for attaching the ends of said ribbon to said opposite edges of said sheet, and means for forming a bend in said ribbon between the ends thereof.

9. As an article of manufacture, a supporting stand for a flexible display sheet of known dimensions comprising a tempered metallic ribbon having a concavo-convex cross-section and of a length greater than the distance between two opposite edges of said sheet, means for attaching the ends of said ribbon to said opposite edges of said sheet, and a sleeve slidable upon said ribbon for maintaining a bend in said ribbon at any desired portion of the length thereof.

10. As an article of manufacture, a supporting stand for a flexible display sheet of known dimensions comprising a tempered metallic ribbon having a concavo-convex cross-section and of a length greater than the distance between two opposite edges of said sheet, means for attaching the ends of said ribbon to said opposite edges of said sheet, and a sleeve slidable upon said ribbon and having a passage therethrough of sufficient width to receive two plies of said ribbon.

WILLIAM STUEBING, Jr.